US005704106A

United States Patent [19]

Sampson et al.

[11] Patent Number: 5,704,106

[45] Date of Patent: Jan. 6, 1998

[54] MODULAR TUBING ASSEMBLY DEVICE

[75] Inventors: Richard K. Sampson; James K. Sampson, both of Fort Collins, Colo.

[73] Assignee: Value Plastics, Inc., Fort Collins, Colo.

[21] Appl. No.: 256,645

[22] PCT Filed: Dec. 23, 1992

[86] PCT No.: PCT/US92/11182

§ 371 Date: Jun. 29, 1994

§ 102(e) Date: Jun. 29, 1994

[87] PCT Pub. No.: WO93/12913

PCT Pub. Date: Jul. 8, 1993

Related U.S. Application Data

[63] Continuation of Ser. No. 814,862, Dec. 30, 1991, abandoned.

[51] Int. Cl.[6] .......... B23P 19/04

[52] U.S. Cl. .......... 29/450; 29/235; 29/237; 29/267; 29/525

[58] Field of Search .......... 29/235, 450, 525, 29/237, 282, 267; 269/257, 275, 286

[56] References Cited

U.S. PATENT DOCUMENTS

| | | |
|---|---|---|
| 2,941,598 | 6/1960 | Jackson . |
| 2,986,192 | 5/1961 | MacLeod . |
| 3,164,899 | 1/1965 | Raze . |
| 3,238,609 | 3/1966 | Nichols . |
| 4,114,656 | 9/1978 | Kish . |
| 4,257,135 | 3/1981 | Moebius . |
| 4,408,381 | 10/1983 | Kish . |
| 4,412,380 | 11/1983 | Kish . |
| 4,526,070 | 7/1985 | Wiener et al. . |
| 4,660,270 | 4/1987 | Rieben et al. . |
| 4,757,588 | 7/1988 | Churchich . |
| 4,811,441 | 3/1989 | Potesta . |
| 4,945,621 | 8/1990 | Sugiyama . |
| 5,048,169 | 9/1991 | Beggiato . |
| 5,084,953 | 2/1992 | Nye et al. . |

FOREIGN PATENT DOCUMENTS

| | | |
|---|---|---|
| 6502786 | 3/1965 | Netherlands . |

*Primary Examiner*—Joseph M. Gorski
*Attorney, Agent, or Firm*—Luke Santangelo

[57] ABSTRACT

An automatic tubing assembly device of modular design and suitable to utilization with thin-walled, flexible tubing is shown in several embodiments. The device includes a mechanical assembly for pure rectilinear motion to avoid tubing damage and an elongated jaw set (18) which applies a force to the tubing (45) over the fitting (1) involved and which flexes outward over the fitting (1). Use of a springed friction member (54) and sliding cam (21) act to achieve the rectilinear motion. The fitting (1) is supported along its length and the entire device is operable from one lever (7) which has only one degree of freedom and thus lends itself to assembly line automated uses. Additionally, multiple axis fittings can be accommodated through simple reconfiguration of the modular design.

33 Claims, 13 Drawing Sheets

MODULAR TUBING ASSEMBLY DEVICE

This is a continuation of application Ser. No. 07/814,862, filed Dec. 30, 1991, now abandoned.

I. TECHNICAL FIELD

The present invention relates generally to the field of automatic devices for the repetitive assembly of flexible tubing and fittings. Specifically, the invention focuses on devices which can accommodate a-variety of tubing characteristics, including thin, extremely flexible tubing.

II. BACKGROUND OF THE INVENTION

For many years, flexible tubing has been an important component in a broad variety of designs. In the vast majority of applications, the tubing is joined to a system by sliding it over a fitting which causes the tubing to expand and securely engage the fitting. While such designs have been in use for over a century, little attention has been paid to how the tubing is actually attached to the fitting. Perhaps even more surprising is the fact that in spite of the wide spread use of such assemblies, even the concept of automating the creation of these assemblies has not been the focus of efforts until the last few years.

In many of those few efforts which have been made at automating the creation of such assemblies, those skilled in the art have frequently focused upon creating devices which specifically accommodate particular tubing or fitting designs. As an example of this type of device, U.S. Pat. No. 4,408,381 to Kish in 1983, discloses a device which is designed to be used with a particular type of hose which has a metal shell on its end. Similarly, U.S. Pat. No. 4,757,588 to Churchich in 1988, discloses a plier-type device which is particularly designed to engage fittings having a certain base design. While these types of designs no doubt work well in their specific applications, they do not lend themselves to utilization in a variety of applications. The present invention overcomes this limitation among others.

In 1989, a particular design which combined both an automatic character as well as a relatively universal design was disclosed in U.S. Pat. No. 4,811,441 to Potesta. While this device is of a more universal nature, it, too, presents limitations which restrict the variety of applications to which it may be applied.

One of the characteristics which practically every previous device relies upon to accomplish insertion is the integrity of the tubing itself. Specifically, virtually every device relies upon the tubing to have sufficient structural rigidity in order to accomplish actually forcing the tubing itself over the fitting. While, obviously, this works for certain types of tubing, it does not work for very thin or extremely flexible tubing. Additionally, devices of the prior art tend to maximize the grip on the tubing by increasing the degree of force with which the tubing is clamped. Again, while this undoubtedly works for certain types of tubing, in many applications it would actually damage the tubing and potentially make the resulting assembly either unusable or unreliable. This is perhaps underscored by the fact that internal pressurization or tensile pull failures of such assemblies predominately occur in the tubing at locations adjacent to the fitting.

Apart from the focus on the tubing assembly itself, in addition, the prior art devices have generally involved multi-step operations. While the devices have automated the process to a degree, they have not accomplished that goal in manners which fully lend themselves to assembly line needs. In this regard, it should be recognized that since tubing assemblies are wide spread in a variety of applications, the creation of such assemblies in a repetitive fashion is also wide spread. Thus, the full automation of such assemblies is highly desirable. The present invention achieves such automation to a higher degree than that achieved by the prior art.

Also, in understanding the general characteristics of the present invention, applications for tubing assemblies—such as those in the medical field—which require assembly in a clean room environment, are also addressed by the present invention. Notably, virtually every device of the prior art utilizes either metal or other very rigid material in their designs. The present invention overcomes this need and in doing so lends itself to medical and other such applications.

By recognizing the limitations of the prior art, the present invention has achieved its leaps in performance and applicability. While such improvements might, in hindsight, appear easily understandable, it should be appreciated that mere recognition of the problem itself has not been evident to those skilled in the art prior to the present invention. No doubt this is in part due to the fact that the art, being over a hundred years old, tends not to be one which is the subject of regular innovation. Certainly, the mere fact that perhaps millions of tubing assemblies are assembled every day indicates that a long felt need to automate the creation of such assembly has existed. Yet, as mentioned earlier, even the mere automation of the creation of such assemblies has not been the subject of innovation until the last few years. Those skilled in the art simply failed to see the types of problems which are addressed by the present invention. While the commercial need for an extremely simple, automated assembly device might appear self-evident in hindsight, in reality, those skilled in the art were either blindly content with manual assembly techniques or failed to understand that certain types of tubing assembly characteristics could be accommodated by an automatic device.

The failure of those skilled in the art to recognize the possibility of successfully addressing this need may also have been fostered by the direction taken in most prior art devices. Specifically, in gripping the tubing, such devices tend to rely upon higher gripping forces than may be desirable. These devices not only taught away from the direction taken by the present invention, but they also may have caused those skilled in the art to accept existing solutions and thus suppress a long-felt need for a solution to the particular problems involved in their applications. Further, it is even possible that the unexpectedly simple designs of the present invention may have not lent themselves to an incremental approach to the innovation necessary to solve the problems involved. As a result, it is even possible that the present invention may even allow fitting and tubing designs to evolve from that which is driven to a large degree by the needs of the assembly process to that which focuses upon the needs of the application.

III. DISCLOSURE OF INVENTION

Accordingly, the present invention provides a device which automatically creates a tubing assembly through only one simple motion. In the device the tubing is gripped by jaws which automatically limit the amount of force involved and which also grip the tubing without causing any tangential (forward) force upon the tubing. Once gripped, the tubing moves forward together with the jaws to be inserted on the fitting. In accomplishing this step, the device applies force to all areas of the tubing contained in the jaws—even that over the fitting itself. In addition, certain embodiments accommodate any need for expansion of the tubing itself due to the insertion process and also allow for sliding of a portion of the tubing during the insertion process. In certain applications, the device also allows additional strokes or applications of an insertion force by the same motion which accomplishes the original effort. Throughout the insertion process the device supports the fitting along its length, even in areas which are surrounded by the tubing, which may allow fitting design to evolve as applications require, not as assembly needs require. Importantly, the device is also modular to allow for easy accommodation of varying assemblies and even allows for the accommodation of multiple tubing fittings, such as T-shaped fittings and the like, by one assembly process.

A general goal of the invention is to provide a device which automates the creation of a tubing assembly. In keeping with this general goal an object is to provide a device in which a single back and forth motion in only one degree of freedom creates the entire assembly. The invention thus lends itself to full automation by the application of only one external force. The single motion involved is designed to cause pure rectilinear motion of the jaws throughout the entire process. Further, in keeping with the general goal of as automated an assembly process as possible, the present invention has as a goal providing a design from which the finished tubing assembly product may be easily and quickly removed. In its design the invention is intended to practically accommodate tubing regularly in use. It is thus a goal of the invention that it work well with tubing which was coiled immediately following its own fabrication process. Further, under the goal of automating the process, the present invention is designed for mass production use in that it attempts as much automation as possible. In this regard the invention has as a goal to provide embodiments which automatically reload themselves for further utilization.

Another general goal of the present invention is to provide a design which accommodates various tubing assembly characteristics. As this goal includes not only the characteristics of the finished product, but also the design and material characteristics of both the tubing and the fitting itself. As to the tubing, it is a goal of the present invention not to deform the tubing during the tubing assembly procedure. This goal results in allowing the device to be utilized for thin or extremely flexible tubing. The device also has a goal to allow the sliding of a portion of the tubing even within the clamping means. Specifically, the present invention allows a portion of the tubing (that which is actually positioned on the fitting) to slide relative to other portions of the tubing along an axial direction. While accomplishing this goal, the present invention also achieves the goal of applying force to the portion of the tubing which is over the fitting itself while accommodating the radial expansion needs of the tubing as it is placed over the fitting.

As mentioned earlier, the accommodation of various tubing and fitting characteristics is important. In keeping with this goal the present invention provides a design which avoids any application of tangential force until the tubing has been fully clamped. It thus allows utilization with tubings that are both kink and notch sensitive.

Another general goal of the invention is to provide a design which allows easy reconfiguration for varying applications. It is an object of the invention to provide a modular design which can be adapted quickly to different fittings and tubings. In allowing for easy variation to particular applications, it is also a goal of the present invention to provide a design which can be utilized with multi-axis fittings. Again, the modular design is retained for easy variation even in such multi-axis fitting applications.

Yet another general goal of the present invention is to allow a design which is suitable for use in clean room environments. Accordingly, it is a goal to provide a design which can be manually used in all regards. A goal is also to allow a design which can be reconfigured for varying applications without the use of any tools or other additional devices. For specific clean room applications, the present invention can be fabricated entirely of non-metallic parts and can be cleaned in commonly used solvents such as deionized water and chlorofluorocarbons without adverse effects to the device.

Finally, another goal is for the device to lend itself to utilization with fittings which may be designed to meet the needs of the applications, not by the needs of assembly. Specifically, the device has a feature which is capable of supporting the fitting along its length either laterally or both laterally and axially.

Naturally, further objects of the invention are disclosed throughout other areas of the specification and claims.

IV. BRIEF DESCRIPTION OF DRAWINGS

Figure 1:
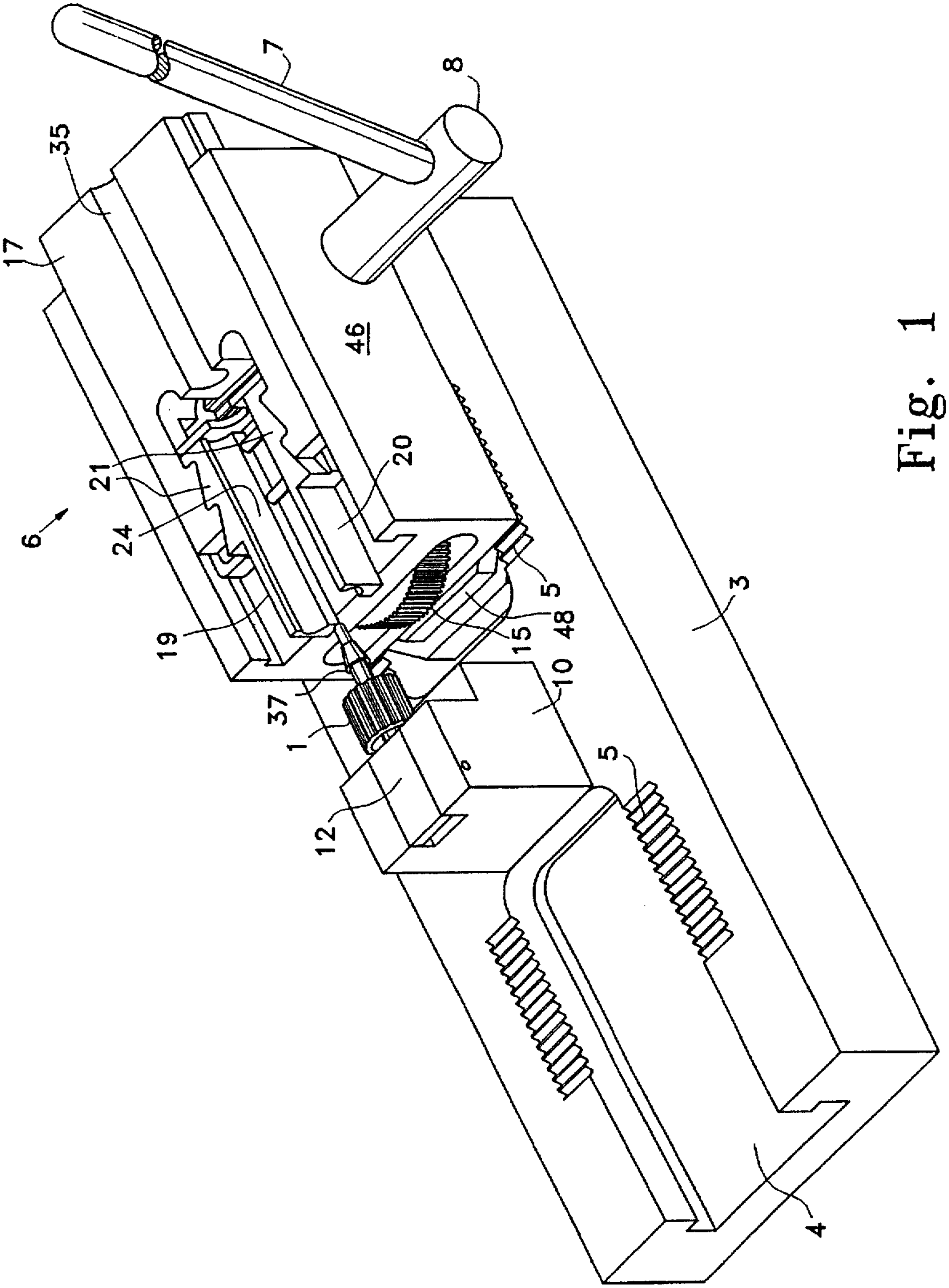
FIG. 1 is a perspective view of one embodiment of the present invention showing a single axis fitting installed thereon and showing the device in the retracted position.
Figure 3A:
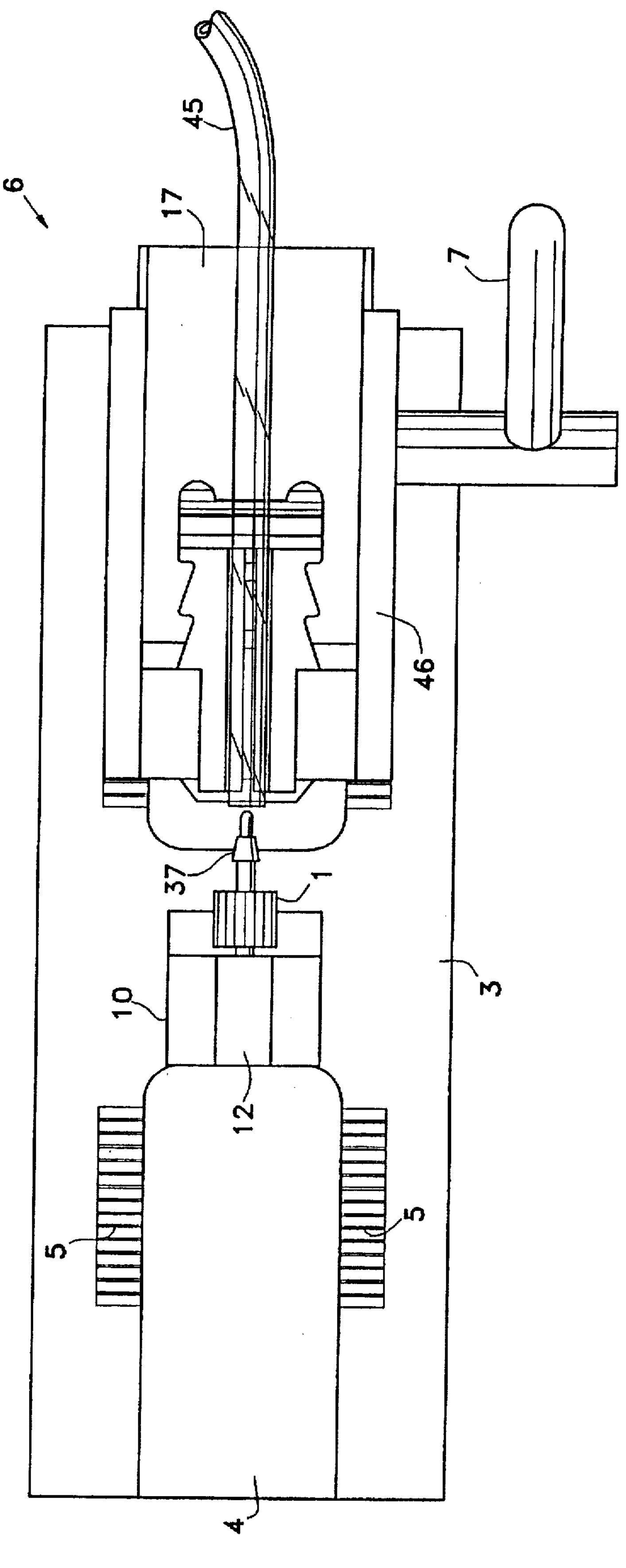

FIG. 3*a* is a top view of the device shown in FIG. 1 with the tubing installed prior to clamping and insertion.

Figure 3B:
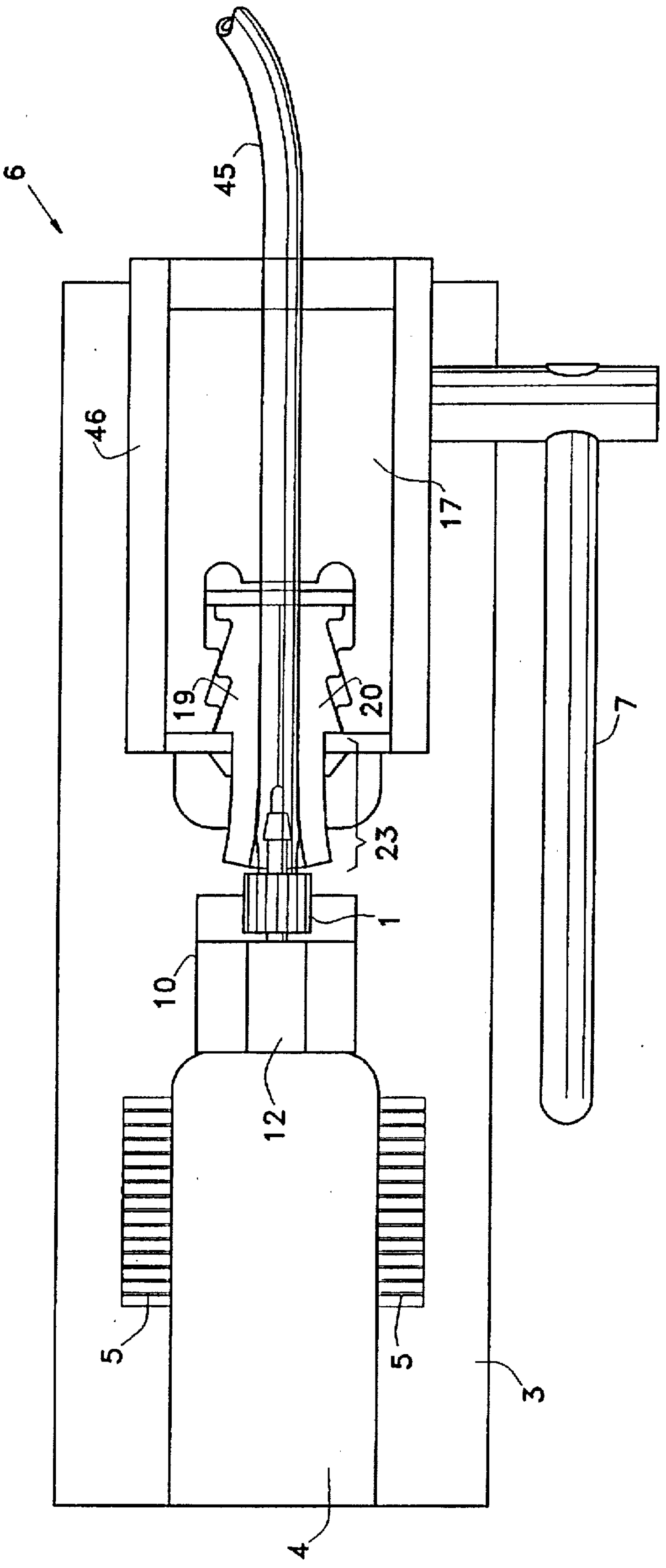

FIG. 3*b* is a top view as shown in FIG. 3*a* with the jaws and tubing in the forward position inserted over the fitting.

Figure 4:
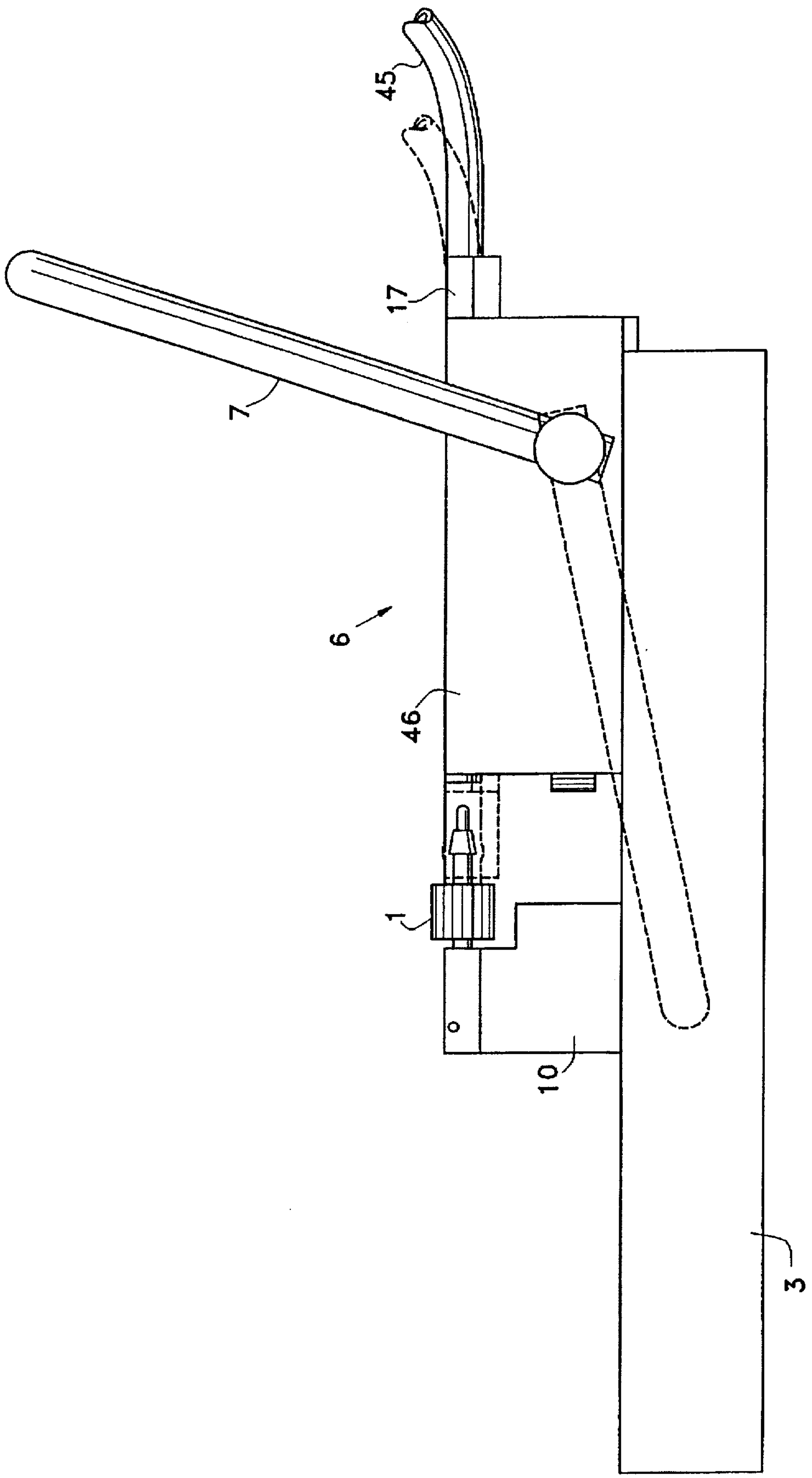

FIG. 4 is a side view of the embodiment shown in FIG. 1 showing both the retracted and forward positions.

Figure 5:
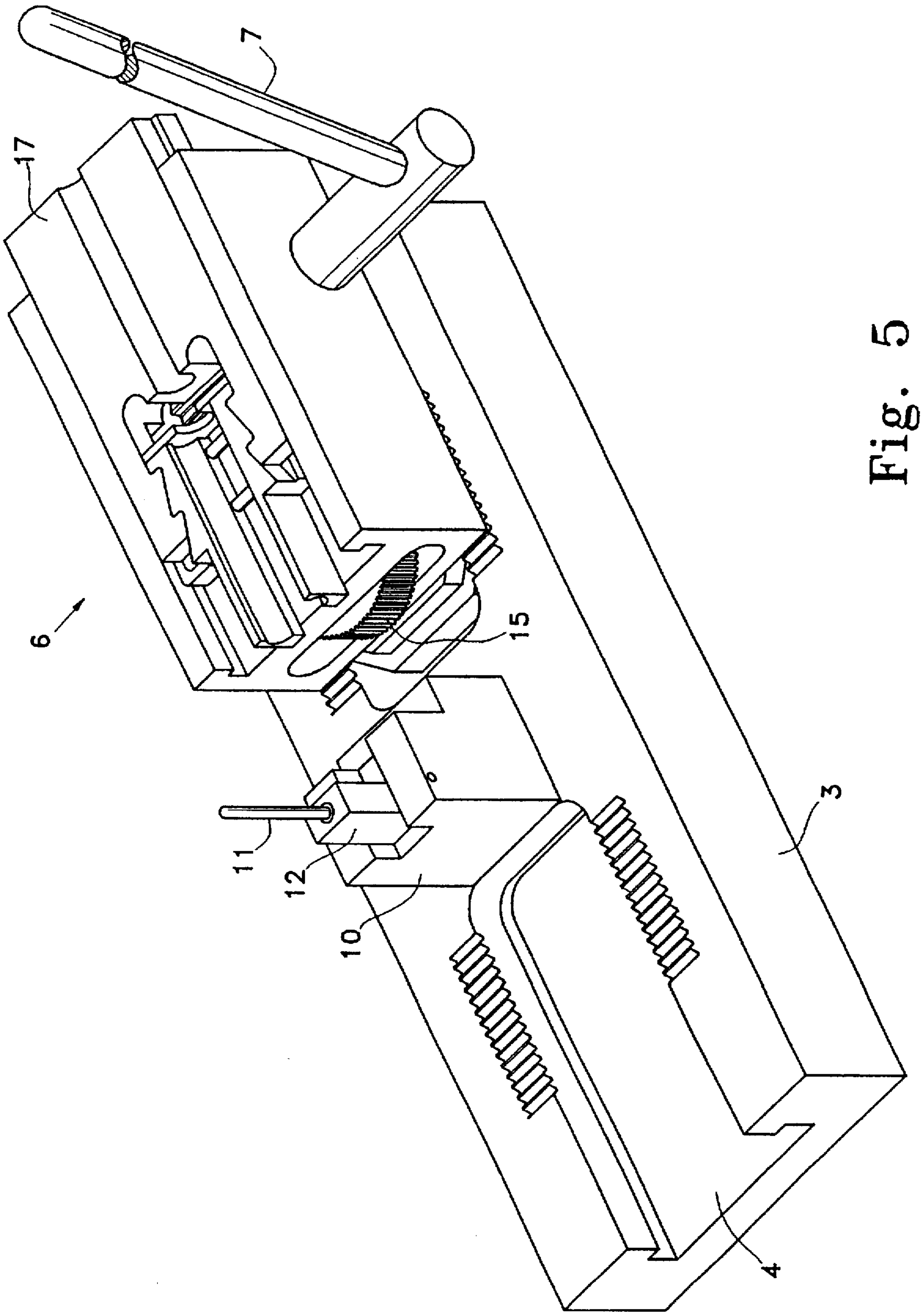

FIG. 5 is a perspective view of the embodiment shown in FIG. 1 showing the fitting pivot block and pin rotated to the vertical position.

Figure 6:
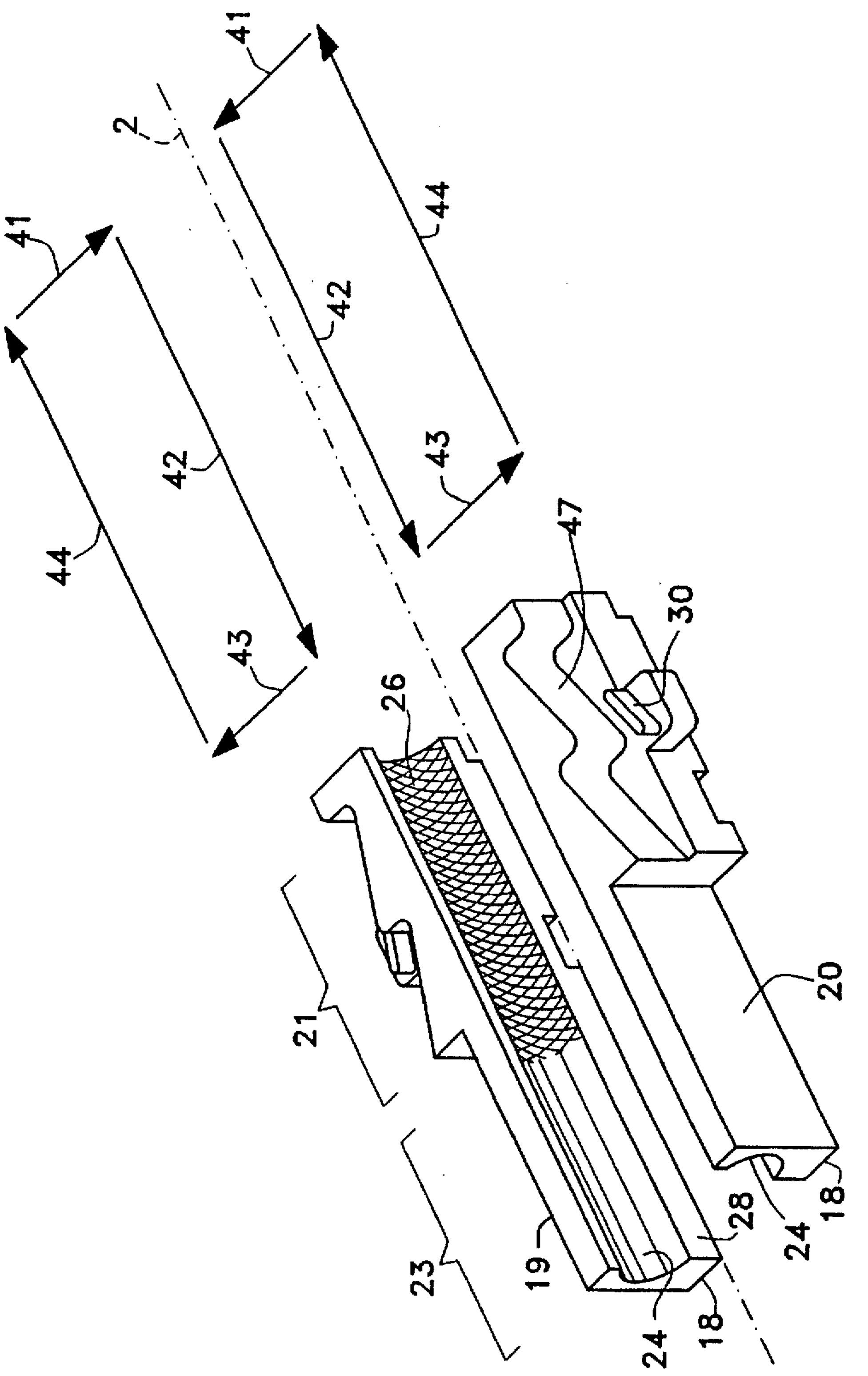

FIG. 6 is a perspective view of another embodiment of the base assembly showing the jaws having internal knurling.

Figure 7:
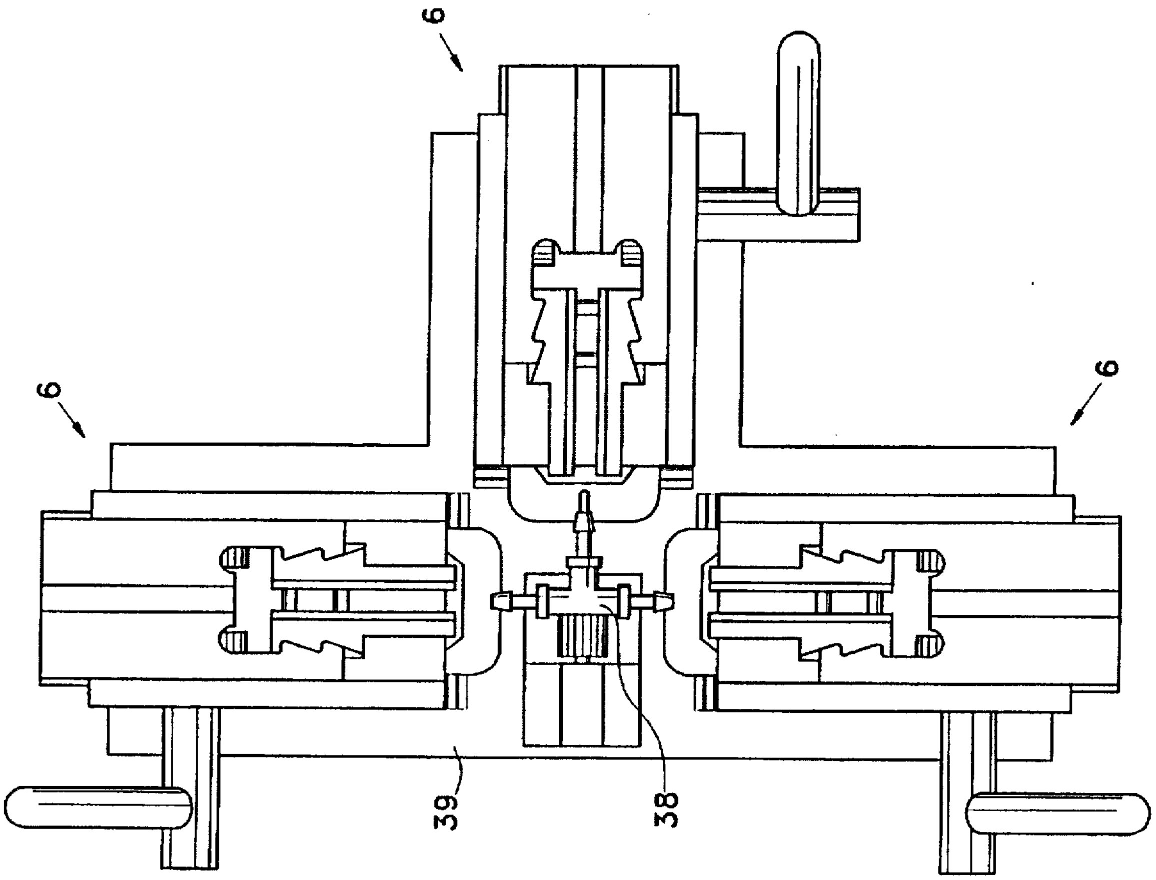

FIG. 7 is a top view of another embodiment of the invention showing a multi-axis fitting and base and numerous identical base assemblies aligned with each axis of the fitting.

Figure 8:
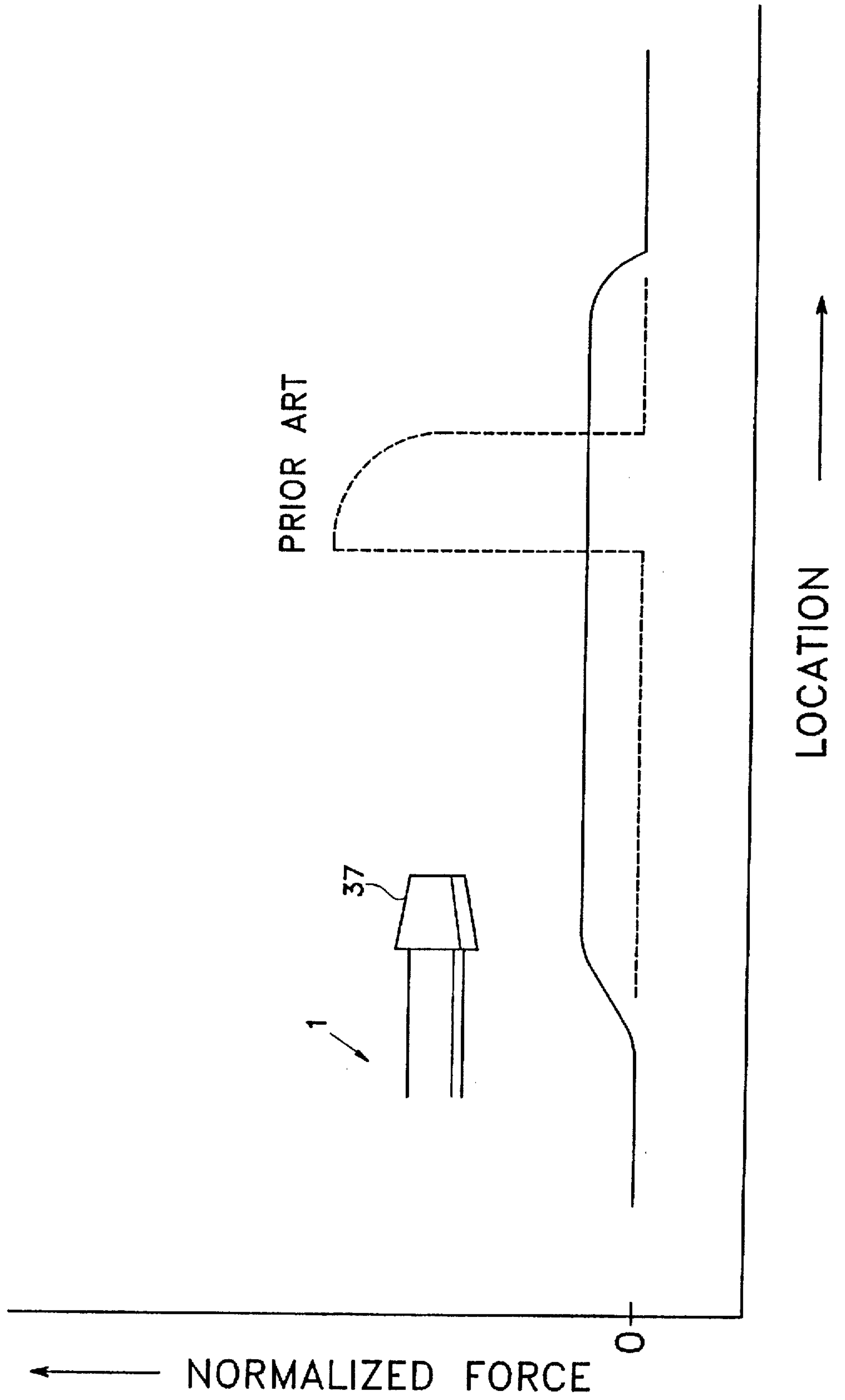

FIG. 8 is a graphic representation of the axial force along a length of tubing for both the prior art and the present invention.

Figure 9:
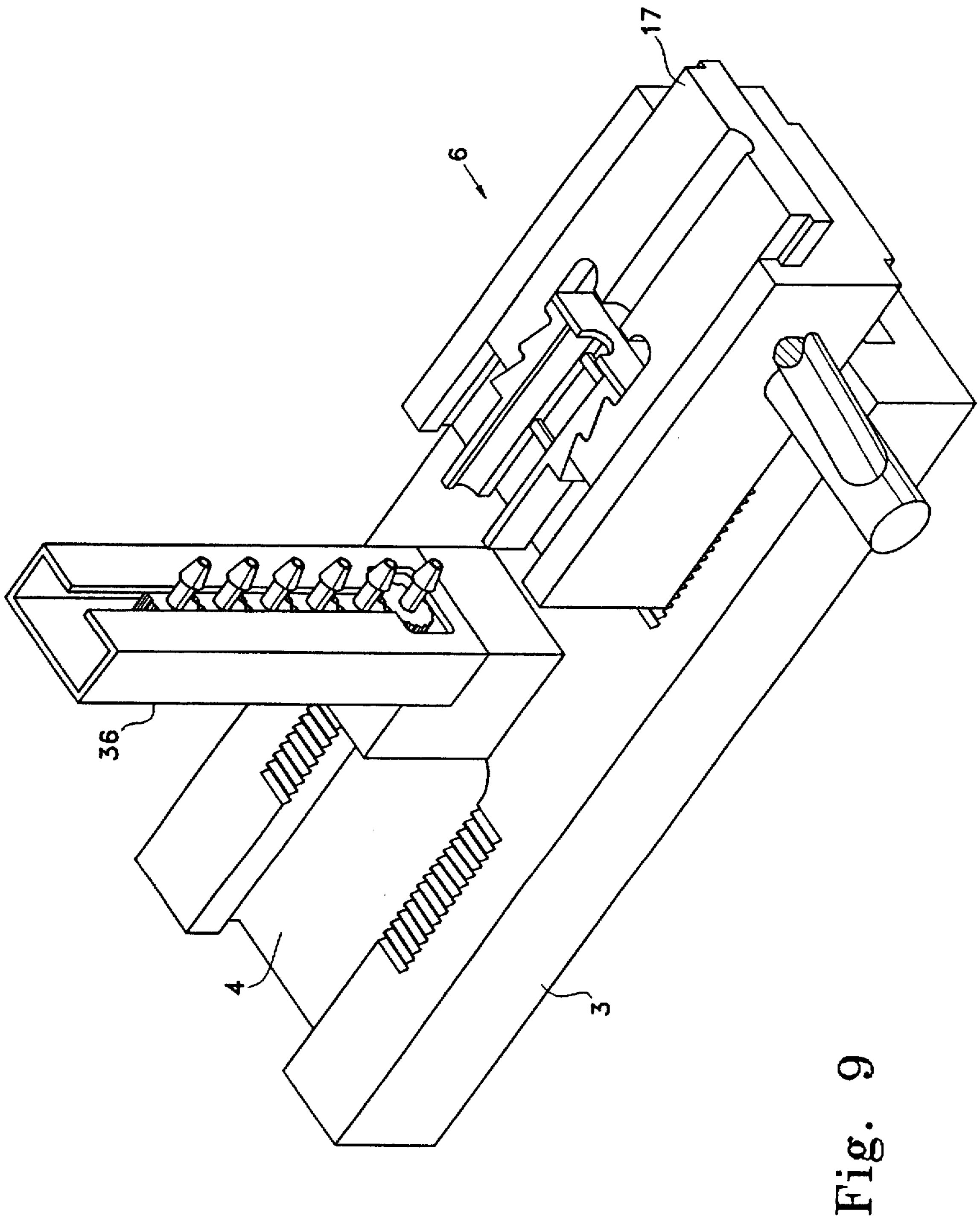

FIG. 9 is a perspective view of an embodiment of the device with a fitting magazine attached.

Figure 10:
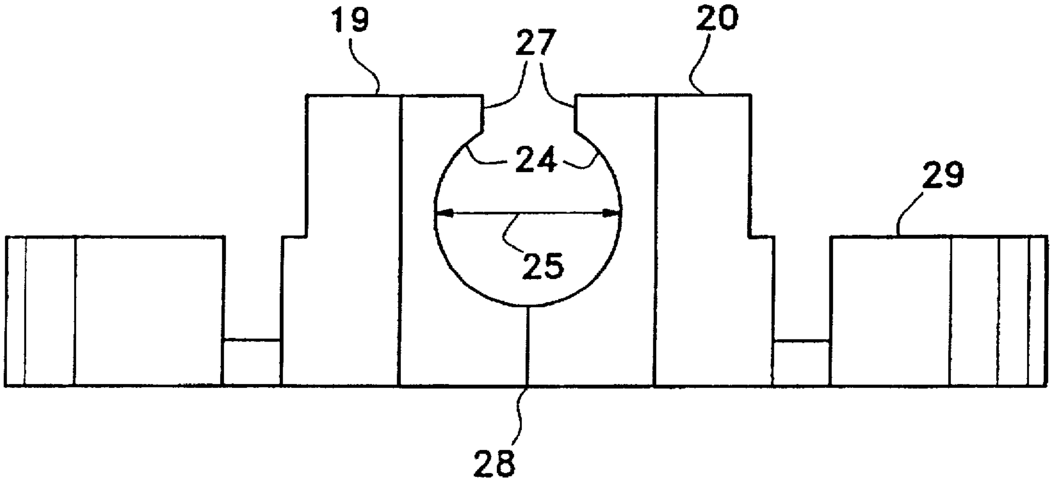

FIG. 10 is an end view of the jaws in the closed position.

Figure 11:
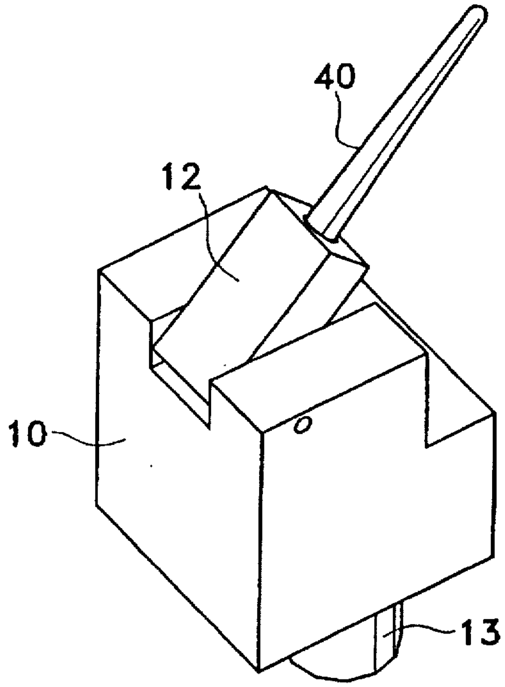

FIG. 11 is a view of a tapered pin member.

Figure 12A:
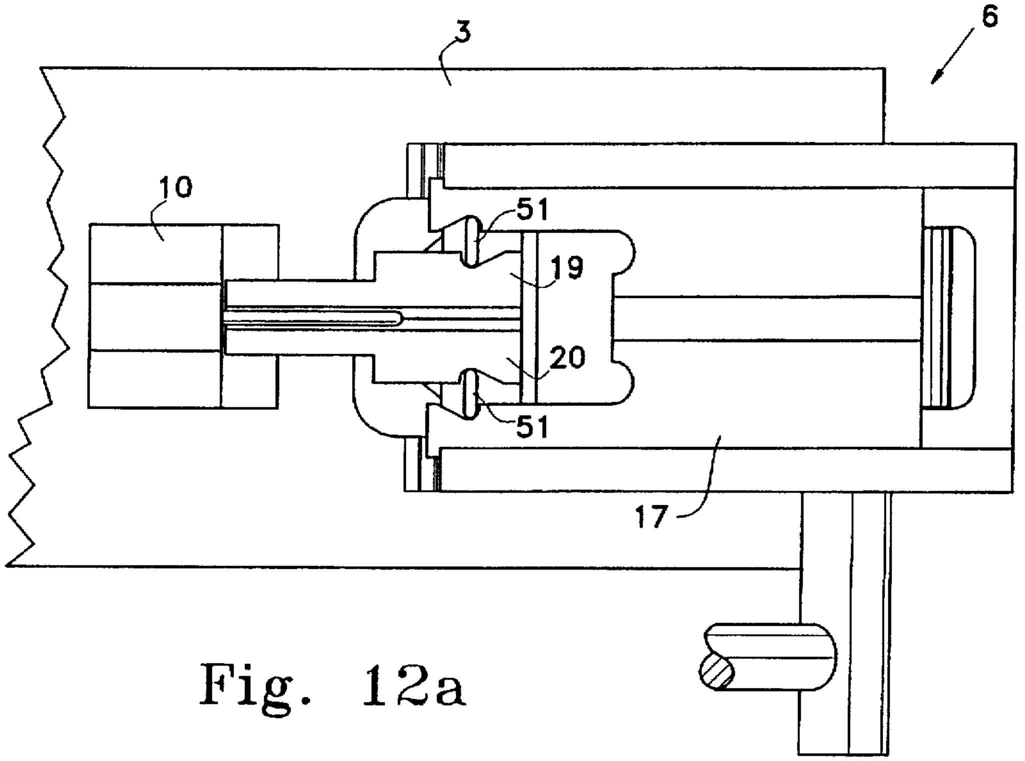
Figure 12B:
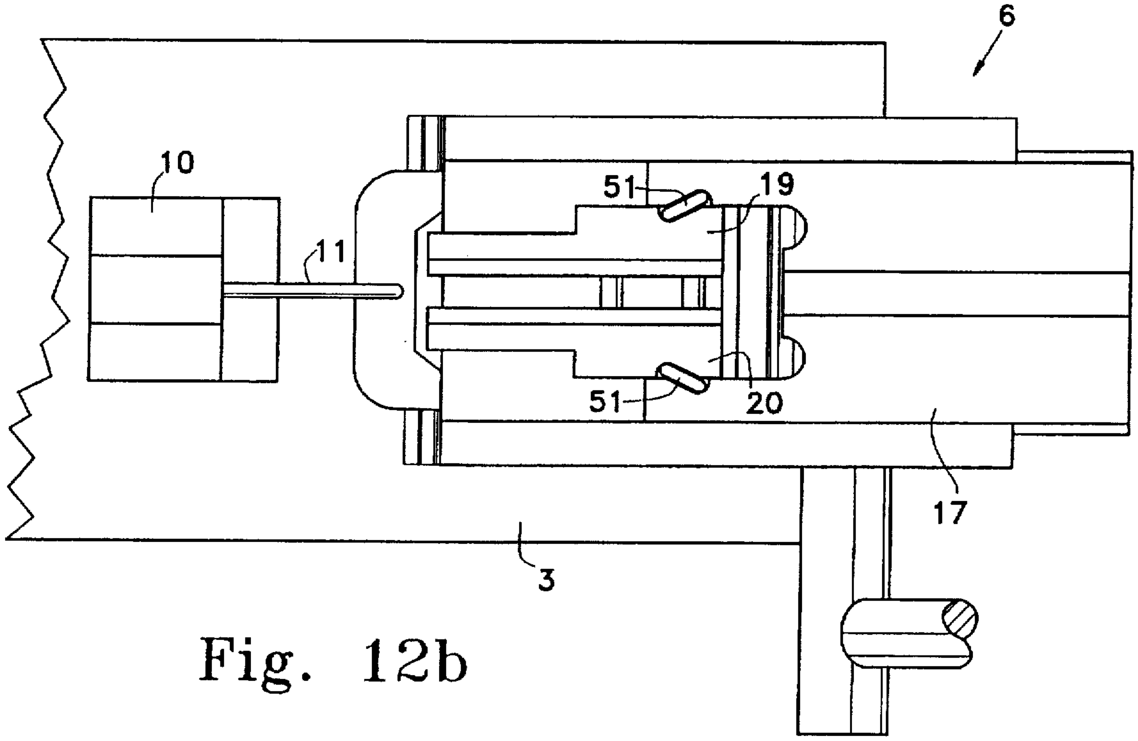

FIGS. 12*a* and 12*b* are top views of another embodiment of the pivot member and jaw interaction in the closed and open positions respectively.

Figure 13:
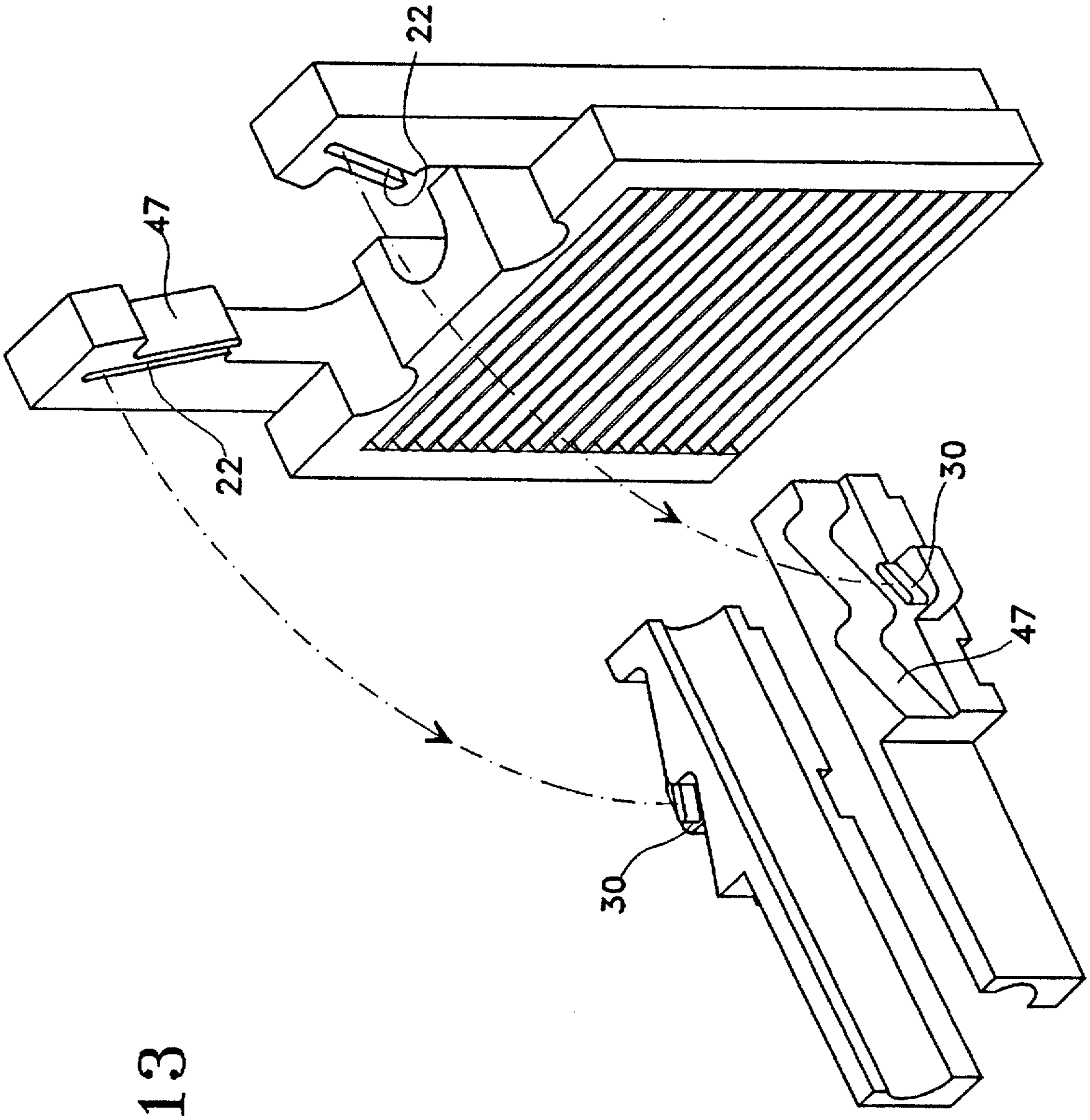

FIG. 13 is a view of the underside of the jaws and sliding cam showing the opening cam slot and stem.

V. BEST MODE(S) FOR CARRYING OUT THE INVENTION

As can be seen from the drawings, the basic concepts of the present invention can be embodied in many ways. Referring to FIG. 1, a perspective view of one embodiment, basic concepts of the device can be understood. The embodiment includes base plate (3) which supports base assembly (6) and anvil (10) relative to each other. Base assembly (6) is designed to engage tubing (not shown in FIG. 1) and to automatically insert it over fitting (1). The motion of the tubing is accomplished through movement of handle (7) as will be discussed later. As can be seen, base plate (3) has two base plate channels which are integral to it. As shown in FIG. 1 only one of the base plate channels (4) is utilized, the other base plate channel (4) having no base assembly attached to it. This empty base plate channel illustrates the location of ridges (5) which serve to allow adjustment of the relative position of base assembly (6) with respect to anvil (10). The exact details of this adjustment are discussed later.

Figure 2:
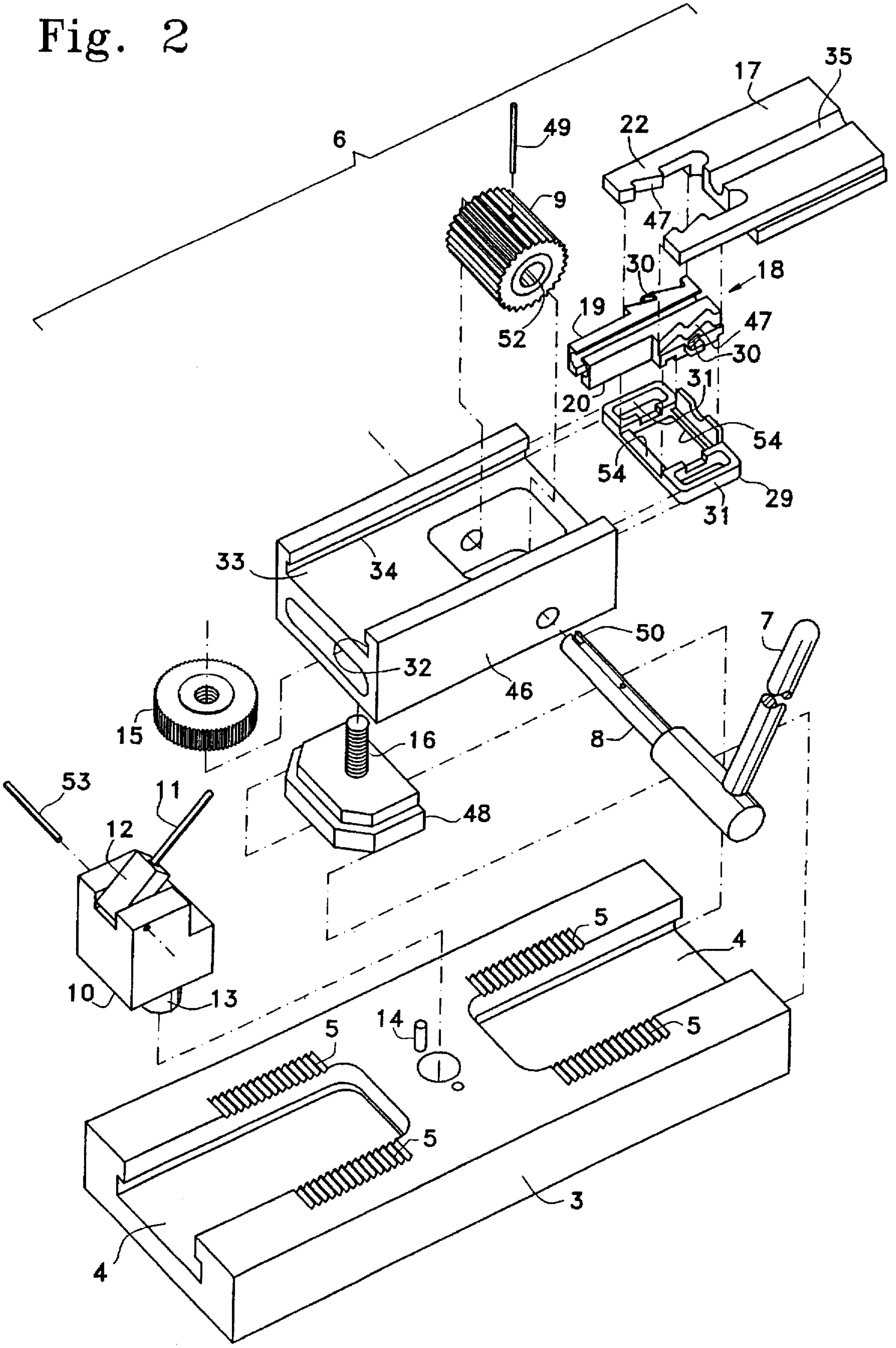
FIG. 2 is an exploded view of the device shown in FIG. 1.

Referring now to FIG. 2, the exploded view of the embodiment shown in FIG. 1, the parts of base assembly (6) can be further understood. Base assembly (6) consists of base assembly block (46) into which is inserted adjustment knob (15). Adjustment knob (15) tightens bolt (16) which engages T-slot nut (48) within base plate channel (4). T-slot nut (48) serves to firmly pull base assembly block (46) against base plate (3) thus causing base assembly block (46) to engage ridges (5). Base assembly block (46) may include corresponding ridges (not shown) to engage ridges (5) in a positive fashion as is readily understood by those skilled in the art. More importantly, through loosening and then retightening adjustment knob (15), base assembly block (46), and thus entire base assembly (6), can be repositioned with respect to fitting (1). The exact positioning of this self-assembly will be discussed later on.

In addition, base assembly block (46) is designed to accept drive axle (52) which in turn is engaged by drive shaft (8), drive shaft (8) in turn may be rotated through the operation of handle (7) as shown in FIG. 4. As can be seen in FIG. 4, the operation of handle (7) acts to move a portion of base assembly (6) forward causing insertion of tubing (45) over fitting (1). This is accomplished by the rotation of drive gear (9) which is attached to drive axle (52) by cross pin (49) as seen in FIG. 2. Cross pin (49) is designed to engage drive shaft slot (50) to facilitate reversal of the handle. Drive gear (9) serves to engage sliding cam (17) through teeth located on the underside of sliding cam as can be easily understood by those skilled in the art. Sliding cam (17) is positioned within guide slot (33) on base assembly block (46). Guide slot (33) is adapted to be parallel to central axis (2) for proper alignment as shown in FIGS. 2 and 6.

In this embodiment, sliding cam (17) includes angled surfaces (47) which engage corresponding surfaces on jaw set (18). Jaw set (18) includes left jaw (19) and right jaw (20) which may move perpendicular to central axis (2) to engage tubing (45) along their length. In this embodiment, each of left jaw (19) and right jaw (20) include both a relatively flexible portion (23) and a cam portion (21). Cam portion (21) is relatively inflexible and interacts with angled surfaces (47) to cause the desired rectilinear motion. By use of the term "relatively flexible", it is meant that such an element would actually flex when forces are applied to it as a result the specific tubing or fitting design involved. Thus the term relatively flexible is meant to accommodate both a stiff design in applications such as those involving thick or inflexible tubing and a pliable design when thin or flexible tubing is involved.

To accomplish rectilinear motion, base assembly (6) also includes friction member (29). Friction member (29), shown best in FIG. 2, the exploded view, includes springs (31) on opposite ends. When assembled, friction member (29) can be moved within two cam channels (32) on base assembly block (46), however such movement is resisted by springs (31). Cam channels (32) have friction surfaces (34) along their edge surfaces. Friction surfaces (34) act to engage spring (31) on friction member (29) and thus also serves to cause pure rectilinear motion as described later. As shown in FIG. 13 both left jaw (19) and right jaw (20) have opening cam stems (30) which fit within opening cam slots (22) on sliding cam (17) to cause opening or release of the jaws prior to retraction as discussed later.

Referring to FIG. 10, an end view of the closed jaw set (18), it can be seen that both left jaw (19) and right jaw (20) have an extended lower portion serving as stop (28) to limit the amount of clamping force that can be applied to tubing (45). Stop (28) is positioned at the lower portion of curved inner surface (24). In addition, at the upper portion of curved inner surface (24) is truncated edge (27). Truncated edge (27) may be designed so that it does not completely close about tubing (45) when jaw set (18) is in a closed position. When in a closed position, curved inner surfaces (24) of left jaw (19) and right jaw (20) form an inner diameter (25) which corresponds to the particular characteristic of the tubing (45) involved. This acts as a means for minimizing deformation of tubing (45). Such a means may also be accomplished through internal or external guides or supports, through clamping limits or other alternatives.

Additionally, the device includes anvil (10) to held fitting (1) during insertion. Anvil (10) includes fitting pivot block (12) which supports pin (11) onto which fitting (1) may be positioned. As can be seen in FIG. 5, pivot block (12) can pivot upward (about pivot pin (53)) for insertion and removal of fitting (1) on pin (11) to facilitate both easy insertion of the fitting prior to assembly and removal of the assembly after insertion. Anvil (10) also includes anvil stem (13) which rotatably engages base plate (3). This allows rotation of anvil (10) about a vertical axis and thus accommodates the utilization of either of the two base plate channels (4) shown in FIG. 1. It also accommodates other fitting designs. In rotating anvil (10) about the vertical axis, it can been seen that the embodiment shown in FIG. 2 includes rotation lock (14). Rotation lock (14), as shown in FIG. 2, is simply short pins which act to engage other holes on base plate (3) and thus firmly position anvil (10) with respect to central axis (2).

In another embodiment shown in FIG. 9, it can be seen that anvil (10) may be replaced by fitting magazine (36). Fitting magazine (36) serves to allow numerous fittings to be held in place and to allow automatic repositioning of an empty fitting after insertion has occurred. As can be readily understood, numerous designs of fitting magazine (36) are possible as each may accommodate the particular designs of the various fittings involved. In keeping with the goal of a modular design, fitting magazine (36) may be designed to be easily removed and replaced as need dictates.

In operation, the device may involve positioning fitting (1) against some axial force resistance means which resists the axial, insertion force. As shown in the embodiment, such an axial force resistance means may include anvil (10). It may also be some other design such as a back plate, flat surface, or the like and may even be reversed such that the axial force resistance means acts upon the tubing rather than the fitting, such being but one equivalent way to accomplish the same result.

As also shown in the embodiment, fitting (1) may be placed on some means for supporting. This means for supporting may restrain fitting (1) in either a lateral direction (perpendicular to central axis (2)) or in an axial direction (parallel to central axis (2)). In FIGS. 1 and 5, it can be seen that pin (11) serves as a means for supporting fitting (1) in only the lateral direction. In FIG. 11, tapered pin (40) is shown as an alternative means for supporting fitting (1). Through the inclusion of the taper (exaggerated in the figure), this alternative may serve as a support also in the axial direction. Again, many alternative designs are possible for a means for supporting, such as clamps, tabs, and the like. Such alternatives are naturally encompassed by this patent. Also, the embodiment includes the modular feature of anvil (10) to serve as a means for adapting to various fittings. This means might include utilizing a different anvil, replacing pin (11), or even a multi-diametered pin. Each are also intended to fall within the broader means element.

In placing fitting (1) on pin (11), both pin (11) and fitting pivot block (12) may be positioned in the upright position as shown in FIG. 5. Fitting pivot block (12) would then be rotated to the central axis (2) as required for creation of the tubing assembly. Tubing (45) may be placed into base assembly (6) as shown in FIG. 3*a*, a top view prior to insertion. As can be seen in FIG. 3*a*, handle (7) is in the rearward (7) is in the rearward position. This serves to cause jaw s in both rearward and open positions thus facilitating insertion of tubing (45) into the device. The tubing may then be manually or automatically positioned between some clamp means (45). As shown, the clamp means includes left jaw (19) and right jaw (20). As the prior art shows, numerous alternative designs for the clamp means are possible. Again, while jaw set (18) is preferred at present, alternatives including but not limited to screws, cinches, cams, end the like may be desirable and are to be encompassed by this patent, the essence of this element being only the ability to engage tubing (45).

As mentioned earlier, both left jaw (19) and right jaw (20) include an extended edge to serve as a stop (28). Stop (28) serves as a means for limiting the clamping force on tubing (45). As can be easily understood, the alternatives to the use of the bottom surface as a means for limiting the clamping force are numerous, including other stops (such as at the back of jaw set (18)), sliding members, gauges and the like. The design also provides for self centering jaw set (18) about central axis (2) to align the tubing properly regardless of its size.

In using stop (28) on the bottom of left and right jaw (19 and 20), such may be designed so even when in the open position, tubing (45) cannot slide through the bottom of jaw set (18). This serves to make insertion of tubing within jaw set (18) easier for multiple, assembly line operations. Additionally, left jaw (19) and right jaw (20) may include truncated edge (27). Truncated edge (27) also serves to provide sufficient distance such that when jaw set (18) is in the open position the resulting gap between the truncated edges of each the left and right jaw (19 and 20) is wider than the external diameter of tubing (45), again to facilitate insertion of the tubing within base assembly (6).

In FIG. 2, the exploded view, it can be seen that sliding cam (17) may include slotted indentations (35). Slotted indentations (35) serve to accept the rearward portion of tubing (45) and also facilitate the holding of tubing (45) during the closing of jaw set (18). In addition, slotted indentation (35) may extend to friction member (29) as shown. By including protrusions or a smaller diameter in the indentation in friction member (29), the design may provide frictional engagement of tubing (45) by slightly compressing the tubing and thus helping to hold tubing (45) firmly in place prior to closing of jaw set (18) while not providing such compression to the extent that tubing (45) is damaged. In placing tubing (45) within jaw set (18), it should be understood that the present invention serves to accommodate tubing as it exists in practice. While in prior designs, tubing is usually shown as a straight piece of tubing, such is the ideal case only. In practice, tubing is usually provided in rolls and thus is has a tendency to curl as shown in FIG. 3*a*. By providing a lengthened jaw set (18) and slotted indentation (35), the tendency of tubing (45) to curl is more easily overcome. Inclusion of tabs and the like in friction member (29) would not only facilitate holding tubing, but it would also facilitate accomplishing pure rectilinear motion as described later since friction member (29) never moves axially relative to jaw set (18) in operation.

Once fitting (1) has been positioned and once tubing (45) has also been positioned, the device may be activated through operation of some axial force means. Such a means may be simply handle (7), or it may include hydraulic or mechanical devices as well. Importantly, it can be understood that handle (7) only operates with one degree of freedom—rotation about a fixed axis defined by drive shaft (8). By providing only one degree of freedom, the operation of the entire device is greatly simplified. While this simplification may seem not to be that critical, it is in fact very important to assembly line operations where repetitive tasks are done. This is an important distinction between many prior art devices where the handles or other devices which serve to operate the product frequently can or must be moved throughout more than one degree of freedom.

Operation of the device handle (7) simply involves rotating it in the one direction it can go. The rotation of handle (7) correspondingly causes the rotation of drive axle (52) and thus drive gear (9). Since drive gear (9) engages sliding cam (17) by means of the gear teeth on the underside of sliding cam (17) (such teeth not shown and being readily understood by those skilled in the art), sliding cam (17) is caused to move in a forward direction, that is, a direction towards fitting (1). As can be understood, the forward motion of sliding cam (17) causes a force upon both left jaw (19) and right jaw (20) through the contact of angled surfaces (47) and thus serves as a means for activating the clamp moans. Left jaw (19) and right jaw (20) engage friction member (29) by resting between friction member cross-ties (54). The force caused by springs (31) against friction surface (34) tends to resist forward motion of both the left and right jaws (19 and 20) and the friction member (29). This then causes angled surfaces (47) on sliding cam (17) to slide against corresponding surfaces on jaw set (18). Through the design of the various surfaces jaw set (18) is closed against tubing (45) prior to any forward movement. It thus serves to accomplish clamping in the rearward position without applying any axial force to the tubing. This feature is very important as it accomplishes the first step in pure rectilinear motion—the clamping motion. Referring to FIG. 6 it can been seen that clamping motion (41) is simply the inward movement of both left jaw (19) and right jaw (20) perpendicular to central axis (2). Unlike many prior art designs, this pure perpendicular motion minimizes any damage to tubing (45). This can be extremely important in delicate applications, where merely variation and uncertainty inherent in manual assembly may be unacceptable. Naturally alternative designs are possible and are encompassed by this patent. One such alternative is that shown in FIGS. 12*a* and 12*b*, the use of pivot member (51). As can be seen in these figures, pivot member (51) activates the clamp moans without applying any axial force.

As handle (7) continues to rotate drive shaft (8), jaw set (18) continues to close until the force of curved inner surfaces (27) on tubing (45), or until the force of stops (28) engaging each other, overcome the frictional force of springs

(31) against friction surface (34). Jaw set (18) and its clamped tubing (45) then move forward with continued rotation of handle (7), said insertion motion (42) being shown in FIG. 6. At some point tubing (45) engages fitting (1) and starts to expand over it. As can be seen in FIG. 3a, fitting (1) may include barb (37). Usually, barb (37) on fitting (1) is designed larger than the internal diameter of tubing (45). This serves to cause positive engagement of tubing (45) and fitting (1). Accordingly, tubing (45) may resist insertion of fitting (1). While in many applications this resistance can easily be overcome by the structural rigidity of tubing (45), the present invention does not rely on such structural rigidity for an insertion force.

The inclusion of some means for transforming the axial force to a force applied over the fitting, means that a forward force will be applied along the entire length of tubing (45) within jaw set (18). Thus, the present invention does not rely to any significant degree upon the axial integrity of tubing (45). This allows the present invention to achieve automatic creation of the tubing assembly (the combination of fitting (1) and tubing (45)) when even very flimsy, thin, or flexible tubing is utilized. While devices of the prior art would have a tendency for the tubing to buckle, the present invention overcomes this tendency through its design.

As can be seen in FIGS. 3a and 10, jaw set (18) engages and clamps tubing (45) along a significant length along curved inner surfaces (24). Importantly, jaw set (18) is designed to actually overlap fitting (1) in the insertion process as shown in FIG. 3b, a top view of the device in the forward or fully inserted position. The design thus serves as a means for transforming the axial force to a force transmitted along a length of said tubing which overlaps fitting (1) during engagement of tubing (45) and fitting (1). Again, other designs are possible, including separate clamps, protrusions, and the like. In understanding FIGS. 3a and 3b, it should be noted that while tubing (45) is shown in FIG. 3a to extend a bit beyond the forward end of jaw set (18), in many applications, it may be desirable to have tubing (45) flush with the forward end of jaw set (18). As shown, extending tubing (45) beyond the forward end of jaw set (18) may accommodate the inherent reduction in length that occurs in tubing (45) in the region of said tubing that may be caused to expand a significant amount over a barb (37).

In addition, as mentioned earlier and as can be seen in FIG. 3b, jaw set (18) has both relatively flexible portion (23) and cam portion (21). Since cam portion (21) may be relatively inflexible, it should not overlap fitting (1) to any significant degree, such overlap accomplished almost entirely by relatively flexible portion (23). This serves as a means for expanding over fitting (1) as shown. Again, there are numerous designs which might serve as a means for expanding, including mechanical designs, separate jaws, and even guide tracks. Each such design is encompassed by this patent. This sharply departs from all known present designs and is an important Mature to the application of force on tubing (45) over fitting (1). The design may also include a means for varying the degree of flexure of jaw set (18) over fitting (1). As shown, flexible portion (23) of jaw set (18) is simply a thinner section. Sizing, shaping, varying diameters, and material selection might also serve as e means for varying the degree of flexure in this design; other alternatives are of course possible. Also, since the entire design is very modular, a variety of jaw sets may be utilized with one main device as well.

As may be appreciated the resistance of tubing (45) to be inserted over fitting (1) causes some compression of tubing (45). As an added feature, the present invention allows sliding of tubing (45) within some portion of jaw set (18). This is accomplished not only by the flexing of relatively flexible portions (23) as mentioned earlier, but may also be accommodated through the design of curved inner surfaces (24). Specifically, curved inner surfaces (24) may be very smooth in the forward position, or may have a larger inner diameter (25) within the forward position. As shown in FIG. 6, curved inner surfaces (24) may include texturing (26) in the rearward position to assure a firm engagement with tubing (45). Since jaw set (18) does not significantly flex in its rearward, cam portion (21) texturing (26) may or may not be necessary. Naturally, the degree of texturing (26) or the degree in which relatively flexible portion (23) has a larger inner diameter (25) may very to suit the particular designs intended to be accommodated. Such aspects may discretely begin in the vicinity of cam portion (21) of jaw set (18) or may gradually increase along the length of jaw set (18). Each of the above aspects serve as a means for varying the degree of engagement with tubing (45). Also, since the entire design is very modular, a variety of jaw sets may be utilized with one main device as well. In providing a modular design, the invention can also generally accommodate a variety of tubing and fitting characteristics including strength, diameter, tubing braiding, surface sensitivity, and the like.

Forward rotation of handle (7) continues until the assembly process is complete, such defined either by the visual confirmation of full insertion, by the engagement of either the end of tubing (45) or the forward end of jaw set (18) against some portion of fitting (1), pin (11), any other feature of anvil (10), or through some other stop which may be provided through the design of base assembly (6) as could easily be understood in the art. At this point the direction of motion of handle (7) is reversed. As with the function of friction member (29) in the clamping process, friction member (29) acts to cause release of tubing (45) by jaw set (18) prior to any retraction or backward movement of jaw set (18). Again, springs (31) resist rearward motion thus allowing opening of jaw set (18) and release of tubing (45) through release motion (43). This is assured by the inclusion of a means for releasing the clamp means. While mere release designs are possible, the preferred embodiment uses interaction of opening cam stems (30) and opening cam slots (22) as shown in FIG. 13, and the left and right jaw (19 and 20) and friction member cross ties (54) to affirmatively open jaw set (18) as sliding cam (17) moves rearward. As shown, it can be seen that such cams and stems may be designed smaller then the cams which accomplish clamping as no appreciable force is necessary to open the jaws, and they are not required to bear the axial forces created between jaw set (18) and sliding cam (17) at angled surfaces (47) when joining tubing (45) and fitting (1).

Referring to FIG. 6 it can be seen that this release motion (43) is again perpendicular to central axis (2) and is completed prior to retraction motion (44). In the embodiment shown, it is accomplished by motion of handle (7) in only its one degree of freedom as mentioned before. After jaw set (18) is 30 allowed to expand, the perpendicular portions of angled surfaces (47) on jaw set (18) and sliding cam (17) engage and cause both to retract with further motion of handle (7). This acts as a means for returning the clamp means to its original position. Again alternative design including stops, guides, and different motions are possible as alternative means for returning.

In a general sense, it can be understood that the pure rectilinear motion shown in FIG. 6 is very different from the prior art in two regards. First, it is achieved through only movement of one handle and in only one degree of freedom. Second, unlike many prior art devices it is not simply the retracing of one motion that occurs. Specifically clamping motion (41) which is followed by insertion motion (42) is not retraced (i.e., the reverse of insertion motion (42) followed by the reverse of clamping motion (41)). To the contrary, after insertion motion (42), release motion (43) is fully accomplished prior to any retraction motion (44). Importantly, the interaction of aspects of base assembly (6) acts as a means for accomplishing pure rectilinear motion. In the presently preferred embodiment, this is accomplished by motion of handle (7) in one degree of freedom. Naturally motion throughout more than one degree of freedom (especially in two degrees of freedom as the case for pure rectilinear motion) could also be used as such a means. Even though such a design might seem less adapted to assembly line needs, in specific applications, it might be desirable and thus falls within the scope of this patent.

As can be understood from the pure rectilinear motion shown in FIG. 6, further forward movement of handle (7) would serve to reclamp tubing (45) and to reapply an insertion force onto the tubing. This serves as a means for allowing addition applications of force if full assembly was not accomplished with one rectilinear motion cycle. Admittedly, any additional applications would necessarily involve tubing extending significantly beyond the forward edge of jaw set (18), however, it should be understood that in any such reapplication of force, relatively flexible portion (23) of jaw set (18) would still apply force over some portion of fitting (1). Unlike many prior art devices, this reapplication of a force is accomplished by simply an identical movement of handle (7) through its one degree of freedom.

After sufficient application or applications of the insertion force have occurred, the tubing assembly is simply removed by manually grasping it and pulling it upward from the machine. As shown in FIG. 5, the pivoting of pin (11) of anvil (10) facilitates this removal by allowing fitting (1) to slide off pin (11) in whatever direction is necessary. Again, this facilitates the use of this device in assembly line, repetitive operations, As mentioned earlier, base assembly (6) is designed to be moveable forward and backward on base plate (3) through the loosening and tightening of adjustment knob (15) and the action of T-slot nut (48). This movement not only accommodates varying fitting designs, but it may accommodate the use of different tubings for the same fitting design by allowing a larger or smaller degree of overlap of jaw set (18) on fitting (1) when in the fully inserted, forward position and may even accommodate the use of one anvil (10) for a variety of fittings. While in many applications it may be desirable to have as large a degree of overlap as possible, it is also possible that such an overlap may not be desirable. The present invention thus accommodates these aspects. While an adjustment means which adjusts the degree of overlap is shown as the above combination, it should be understood that numerous alternatives are again possible such as peg and hole designs, L-slot designs, screwed clamps, and the like. It should also be understood that while the means for adjustment is discussed in the context of the possible overlap, there may be applications for which no overlap is desirable. As such, adjustment may be of the relative distance between some point on fitting (1) (such as its stem behind barb (37)) and jaw set (18).

Referring to FIG. 8, it can be understood how the present invention is believed to sharply depart from most prior art devices in the application of shear force along the length of tubing adjacent to fitting (1). Referring first to the prior art, it can be seen that no such force is applied to tubing in the vicinity of fitting (1). Rather, all such force is discretely applied at some distance from fitting (1). Additionally, the amount of force applied per unit distance by the prior art is significantly greater than that applied by the present invention. To achieve similar insertion forces, the prior art must apply its force along a very short region of the tubing compared to that of the present invention. As shown for the present invention, the force somewhat gradually increases until it reaches a stable, lower level as shown, in FIG. 8, relative to the process at an almost fully inserted position. The forces of the present invention are Then fairly constant along 8 relatively long distance of the tubing. As can easily be understood this force is much lower than That of the prior art because such force is applied over a far greater distance than that of the prior art. It then declines as shown at the end of jaw set (18). This sharply departs from the teachings of the prior art by not only presenting lower shear forces (and thus lower potential tubing damage), but also in that sharp increases in force (and thus potential damage) is avoided. It thus allows the present invention to be utilized for tubing having characteristics which simply would not work for many of the prior art devices.

Another feature of the present invention is the fact that its modular design allows easy accommodation of various fitting types. Referring to FIG. 7, it can be seen that through the use of a multiple axis base plate (39), numerous base assemblies can be positioned with respect to a fitting such as a cross or T-fitting (38) shown. Such a base plate may be of a radial design so that all base plate channels are approximately aligned with a common central point. While shown in FIG. 7 as a fitting having three identical barb sizes and a fourth fitting not intended for tubing insertion, naturally different jaw sets or even completely different base assemblies could be utilized to accommodate fittings having drastically different sizes. In a similar fashion, single axis fitting designs which require the insertion of tubing from either end can be easily accommodated as well. This modular system enhances the applications of the present invention. FIG. 7 also illustrates how handle (7) is reversible by showing some base assemblies (6) as right-handed and others as left-handed. This is easily changed through the design elements of cross pin (49) and drive shaft slot (50).

Finally, FIG. 9 shows the inclusion of fitting magazine (36) in the modular design. As can be appreciated, fitting magazine (36) serves as one moans for automatically reloading the device with another fitting after use. Such a means may actually be of a great variety of designs which accommodate the various fittings potentially utilized. Since such variation is fitting specific, fitting magazine (36) is shown in a very simple form to illustrate the concept rather than to act as any limitation on the scope of such a means element.

The foregoing discussion and the claims which follow describe the preferred embodiments of the present invention. Particularly with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention, each would naturally fall within the breadth of protection encompassed by this patent. This is particularly true for the present invention since its basic concepts and understandings are fundamental in nature and can be broadly applied. Also, in claiming the invention, it should be understood that each element may be combined with other elements to afford substantial advantage. Again, all possible permutations and combinations of the various elements are not listed, but are intended to fall within the scope of protection afforded.

We claim:

1. A combination of a fitting, elastic tubing to which the fitting is inserted and attached, and an assembly device for attaching the tubing to the fitting, comprising:

a. an assembly device comprising: a base plate; a fitting support; and movable jaws supported by said base plate and which clamp a length of elastic tubing, wherein at least one of said movable jaws has at least one relatively flexible jaw portion;

b. a fitting supported by said fitting support and having a width; and c. a length of elastic tubing clamped by said movable jaws and having an inside diameter which is less than the maximum width of said fitting;

said assembly device further comprising an axial force means which generates an axial force which moves said movable jaws and said fitting support toward one another such that said tubing becomes attached to said fitting over its width, wherein said length of tubing and said movable jaws overlap said fitting during attachment of said fitting with said tubing, and wherein said at least one relatively flexible jaw portion bends along its length as the tubing is attached to the fitting in response to said width of said fitting, and wherein said fitting support resists said axial force.

2. The combination as described in claim 1 wherein said at least one relatively flexible jaw portion varies the amount of bending along the length as the tubing is attached to the fitting.

3. The combination as described in claim 1 wherein said at least one of said movable jaws comprises a relatively inflexible portion and wherein said relatively inflexible portion does not significantly overlap said fitting during attachment of said fitting with said tubing.

4. The combination as described in claim 1 wherein said jaws have diameters which vary over their length.

5. The combination as described in claim 1 wherein said movable jaws have length and wherein said movable jaws, vary their degree of engagement with said tubing along said length during attachment of said fitting with said tubing.

6. The combination as described in claim 5 wherein said degree of engagement with said tubing is varied by said at least one relatively flexible jaw portion.

7. The combination as described in claim 5 wherein said degree of engagement with said tubing is varied by the inner surface of said jaws.

8. The combination as described in claim 5 wherein said degree of engagement with said tubing is varied by the shape of said jaws.

9. The combination as described in claim 5 wherein said degree of engagement with said tubing along said length is varied by a textured inner surface of at least one of said jaws.

10. The combination as described in claim 9 wherein said texturing varies along the length of said inner surface.

11. The combination as described in claim 1 wherein said movable jaws minimize deformation of the tubing when clamped by the movable jaws.

12. The combination as described in claim 11 wherein said movable jaws generate a clamping force and wherein said movable jaws comprise a means for limiting said clamping force.

13. The combination as described in claim 12 wherein said means for limiting said clamping force comprises a stop.

14. The combination as described in claim 11 wherein said deformation of the tubing is minimized by said jaws being curved.

15. The combination as described in claim 1 wherein said movable jaws comprise:

a. at least two curved members each having a top and a bottom portion and capable of movement relative to each other from an open to a closed position;

b. a stop on each of said bottom portions such that said stops abut in the closed position; and c. a truncated edge on each top portion such that said truncated edges do not abut when in the closed position.

16. The combination as described in claim 15 wherein said curved members move from a rearward to a forward position and wherein said curved members overlap the fitting when in said forward position.

17. The combination as described in claim 1 and further comprising an adjustment means which varies the mount said movable jaws and said length of tubing overlap said fitting during attachment of said fitting with said tubing.

18. A device for assembling a fitting having a stem and elastic tubing comprising:

a. a base plate;

b. an axial force means to engage said tubing with said fitting;

c. an axial force resistance means to which said fitting is responsive, spaced from said axial force means; and d. an adjustment means which varies the spacing between said axial force means and said axial force resistance means; wherein said adjustment means varies said spacing separately from the exertion of an axial force by said axial force means.

19. A device for assembling a fitting and elastic tubing comprising:

a. base plate;

b. an axial force means to engage said tubing and said fitting;

c. an axial force resistance means to which said fitting is responsive; and d. a means for accomplishing insertions in multiple axes;

wherein said axial force means comprises at least one lever arm assembly and wherein said lever arm assembly comprises a means for accomplishing pure rectilinear motion and wherein said means for accomplishing pure rectilinear motion comprises:

i. a lever arm which supplies an insertion force from a rearward to a forward position to engage said tubing and said fitting wherein said lever arm has only one degree of freedom;

ii. a clamp means wherein said clamp means is responsive to said lever arm;

iii. a means for activating the damp means without applying any axial force to the tubing;

iv. a means for applying said axial force to the tubing by moving said clamp means from said rearward position to said forward position;

v. a means for releasing the clamp means; and vi. a means for returning the clamp means to the rearward position.

20. The device as described in claim 19 wherein said lever arm causes activation of said means for activating, said means for releasing, and said means for returning.

21. A method of assembling a fitting to elastic tubing to create a tubing assembly, comprising the steps of:

a. providing a device including a lever arm and clamping members;

b. placing tubing in approximately an axial position on said device, wherein said tubing has an exterior surface; and c. placing a fitting in approximately an axial position relative to said tubing on said device; then d. moving the lever arm forward, thereby bringing said clamping members toward one another such that the tubing becomes clamped between said clamping members prior to applying any axial force to said tubing, and then moving said lever arm further forward, thereby causing said clamping members with said tubing and said fitting to move axially toward one another, thereby bringing said clamping members and the tubing axially into engagement with the fitting; then e. removing said tubing assembly from said device.

22. The method of assembling a fitting and elastic tubing to create a tubing assembly as described in claim 21 and further comprising the step of moving said lever arm backward thereby a. releasing said clamping members from said tubing; and then moving said clamping member axially away from said fitting.

23. The method of assembling a fitting and elastic tubing to create a tubing assembly as described in claim 21 and further comprising the step of expanding said clamping members over the fitting.

24. The method of assembling a fitting and elastic tubing to create a tubing assembly as described in claim 23 wherein the step of expanding said clamping members over the fitting comprises the step of allowing said clamping members to bend in response to said fitting being inserted into said elastic tubing.

25. The method of assembling a fitting and elastic tubing to create a tubing assembly as described in claim 21 and further comprising the step of varying the force applied by said clamping member along the length of the exterior of the tubing from the front of the tubing to the back of the tubing while accomplishing the step of moving said lever arm forward.

26. The method of assembling a fitting and elastic tubing to create a tubing assembly as described in claim 21 and further comprising the step of allowing a portion of the tubing to slide within said clamping members, to accommodate a relative length change of said tubing, while accomplishing the step of moving said lever arm forward.

27. The method of assembling a fitting and elastic tubing to create a tubing assembly as described in claim 21 including the step of not substantially deforming the tubing when it becomes clamped between said clamping members.

28. The method of assembling a fitting and elastic tubing to create a tubing assembly as described in claim 27 wherein the step of clamping applies a clamping force and including the step of clamping further comprises the step of automatically limiting the clamping force applied to the tubing by said clamping members.

29. The method of assembling a fitting and elastic tubing to create a tubing assembly as described in claim 21 and further comprising the step of again moving said lever arm forward to apply additional force to the exterior of the tubing without manually readjusting the tubing before removing the tubing assembly.

30. The method of assembling a fitting and elastic tubing to create a tubing assembly as described in claim 21 or 25 and further comprising the step of supporting the fitting along its length while accomplishing the step of moving said lever arm forward.

31. The method of assembling a fitting and elastic tubing to create a tubing assembly as described in claim 30 wherein said step of supporting the fitting along its length comprises the step of laterally supporting said fitting along its length.

32. The method of assembling a fitting and elastic tubing to create a tubing assembly as described in claim 31 wherein said step of supporting the fitting along its length further comprises the step of axially supporting said fitting along its length.

33. The method of assembling a fitting and elastic tubing to create a tubing assembly as described in claims 21, 24, 26, or 27 and further comprising the step of automatically inserting another fitting in approximately an axial position after accomplishing said step of removing said tubing assembly.

* * * * *